Patented Nov. 1, 1938

2,135,366

UNITED STATES PATENT OFFICE 2,135,366

NAPHTHAZARINE INTERMEDIATE-AROMATIC AMINE CONDENSATION PRODUCTS

John M. Tinker, Penns Grove, and Louis Spiegler, Woodbury, N. J., and David X. Klein, Milwaukee, Wis., assignors to E. I. du Pont de Nemours & Company, Wilmington, Del., a corporation of Delaware No Drawing. Application April 29, 1937, Serial No. 139,730

5 Claims. (Cl. 260—56)

This invention relates to the preparation of new and valuable compounds of the naphthalene series.

It is known that when dinitro-naphthalene is reduced in sulfuric acid a compound generally referred to as "naphthazarine intermediate", having the probable formula

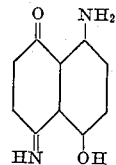

is produced, and that this compound can be condensed with amines and further sulfonated to produce dyestuffs. It is also known that in the formation of this naphthazarine intermediate, because the product is quite easily reduced and oxidized, closely related compounds having the following probable formulas

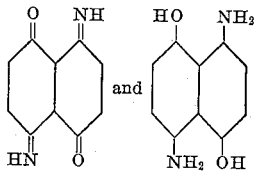

are also formed. All three of these compounds may invariably be present in the crude naphthazarine intermediate product. The naphthazarine intermediate, however, may be obtained in substantially pure form by recrystallization from acetic acid or by oxidation or reduction and filtering the reduced or oxidized material to free from insoluble impurities and then re-oxidizing or reducing back to the intermediate, all of which is known in the prior art.

It has been found that while the condensation products obtained by condensing naphthazarine intermediate with amines, as more fully described in U. S. Patent 647,370, or by condensing the sulfonated product described in U. S. Patent 627,896 with amines by the process described in U. S. Patent 646,796, are suitable for coloring oils, fats and waxes, including petroleum oil fractions such as gasoline, in blue to green shades, and when sulfonated are useful as acid wool dyestuffs, they have practically no affinity for cellulose acetate.

We have found, however, that where the condensation of the arylamine with the naphthazarine intermediate is carefully controlled whereby only one arylamino group is introduced into the naphthazarine intermediate, new compounds are obtained which although less soluble in petroleum oil distillates have good affinity for cellulose acetate, and exhibit good fastness properties when applied to that material.

It is therefore an object of this invention to prepare new and valuable compounds of the naphthalene series by controlled condensation of naphthazarine intermediate with arylamines.

It is a further object of the invention to prepare new and valuable dyestuffs which have good affinity for cellulose acetate and which dye that and related materials in blue to greenish blue shades.

It is a still further object of the invention to dye cellulose acetate and related materials with dye preparations comprising the mono molecular condensation products of naphthazarine intermediate with arylamines.

In preparing these new compounds, the naphthazarine intermediate is dissolved in acetic acid and substantially molecular amounts of the arylamine are added. The mass is heated for a few minutes to temperatures of from about 90° C. to the boiling point of the mass and then cooled and any insoluble residue is filtered off. On drowning the filtrate in water the dyestuff precipitates out.

The following examples are given to more fully illustrate a preferred method for preparing these new compounds. The parts used are by weight.

Example 1

9.5 parts of naphthazarine intermediate are dissolved in 200 parts of glacial acetic acid. 5.4 parts of p-phenylene diamine are added and the mixture is heated for fifteen minutes at 90° C. After cooling, crystals of a small amount of insoluble material are filtered off and the filtrate drowned in 2000 parts of water. The precipitate formed is filtered off, washed until the washings assume a pale greenish blue color, and then dried. The blue-black powder when suspended in an aqueous dye bath containing soap dyes cellulose acetate in bright blue shades of excellent light fastness.

Example 2

10 parts of naphthazarine intermediate are dissolved in 200 parts of glacial acetic acid and 5.5 parts of p-aminophenol are added to the solution. The solution is boiled three-fourths of an hour and cooled. A small amount of precipitate is filtered off and the filtrate poured into 2000 parts of water. The precipitated dyestuff is filtered off and washed with water until the red-blue wash turns to blue-green. The precipitate is then dried. It dyes cellulose acetate in bright greenish blue shades of excellent fastness to light.

Other amines of the benzene series may be used to prepare products having the capacity to dye cellulose acetate to a greater or smaller degree. Among these may be mentioned aniline, o-phenetidine, p-aminoacetanilide, p-aminodimethyl-aniline, m-toluidine, etc.

These colors may be applied to cellulose acetate and related materials by suspending them in an aqueous dye bath from which they are directly absorbed by such materials. The following example is given to illustrate a common method for applying such colors to cellulose acetate fibers.

3 parts of the dry powdered color are milled with 12 parts of a 50% solution of the condensation product of beta-naphthalenesulfonic acid and formaldehyde in 15 parts of water. This paste is then added to an aqueous soap solution from which the fiber is dyed at temperatures preferably from 60 to 70° C.

We claim:
1. As new compounds, the condensation products of equal molecular quantities of naphthazarine intermediate and an amine of the benzene series.
2. As a new compound, the condensation product of equal molecular quantities of naphthazarine intermediate and p-aminophenol.
3. The process which comprises reacting naphthazarine intermediate in an organic solvent for the same with an equal molecular quantity of an aromatic amine by heating at a temperature of 90° C. and above.
4. Cellulose acetate dyed with the product of claim 1.
5. Cellulose acetate dyed with the product of claim 2.

JOHN M. TINKER.
LOUIS SPIEGLER.
DAVID X. KLEIN.